United States Patent
Lewis

(10) Patent No.: US 9,658,322 B2
(45) Date of Patent: May 23, 2017

(54) LIDAR OPTICAL SCANNER SYSTEM

(71) Applicant: Garmin Switzerland GmbH, Schaffhausen (CH)

(72) Inventor: Robert A. Lewis, Bend, OR (US)

(73) Assignee: Garmin Switzerland GmbH (CH)

( * ) Notice: Subject to any disclaimer, the term of this patent is extended or adjusted under 35 U.S.C. 154(b) by 89 days.

(21) Appl. No.: 14/658,044

(22) Filed: Mar. 13, 2015

(65) Prior Publication Data

US 2015/0260843 A1    Sep. 17, 2015

Related U.S. Application Data

(60) Provisional application No. 61/952,803, filed on Mar. 13, 2014.

(51) Int. Cl.
| | |
|---|---|
| *G06K 7/10* | (2006.01) |
| *G01S 7/481* | (2006.01) |
| *G02B 26/10* | (2006.01) |
| *G02B 19/00* | (2006.01) |
| *G01S 17/42* | (2006.01) |

(52) U.S. Cl.
CPC .......... *G01S 7/4813* (2013.01); *G01S 7/4817* (2013.01); *G01S 17/42* (2013.01); *G02B 19/0028* (2013.01); *G02B 19/0085* (2013.01); *G02B 26/106* (2013.01); *G02B 26/108* (2013.01)

(58) Field of Classification Search
CPC ...... G01S 7/4813; G01S 7/4817; G01S 14/42; G02B 19/0028; G02B 19/0085; G02B 26/106; G02B 26/108
USPC .............. 235/462.45; 359/203.1, 210.2
See application file for complete search history.

(56) References Cited

U.S. PATENT DOCUMENTS

| | | | |
|---|---|---|---|
| 5,977,536 A * | 11/1999 | Kempas ............. | G02B 23/12 250/216 |
| 6,137,566 A | 10/2000 | Leonard et al. | |
| 6,906,793 B2 | 6/2005 | Bamji et al. | |
| 7,002,669 B2 * | 2/2006 | Frick ............. | G01S 7/4817 356/139.1 |
| 9,239,959 B1 * | 1/2016 | Evans ............. | G06K 9/00791 |
| 2010/0020306 A1 | 1/2010 | Hall | |
| 2012/0038962 A1 * | 2/2012 | Lewis ............. | G02B 26/0808 359/203.1 |

\* cited by examiner

*Primary Examiner* — Laura Gudorf
(74) *Attorney, Agent, or Firm* — Samuel M. Korte; Max M. Ali

(57) ABSTRACT

An optical scanner system comprises a housing, a detector contained within the housing configured to produce at least two resolvable azimuth fields-of-view relative to a center-axis of the housing, and an external scanner rotating relative to the center-axis of the housing, and switching between at least two elevations relative to a nominal optical axis of a receiver. Motion of the housing azimuthally results in the receiver producing a continuous coverage pattern at multiple elevations produced by the external scanner.

15 Claims, 14 Drawing Sheets

$$\frac{360}{w_{offset}} \cdot \frac{w_{housing}}{2} = w_{scanner} \quad (1a)$$

$$\frac{\pi \cdot v_{housing}}{ALT \cdot \tan \Theta_{offset}} = w_{scanner} \quad (1b)$$

FIG. 2B

LIDAR OPTICAL SCANNER SYSTEM

CROSS REFERENCE TO RELATED APPLICATION

This application claims the benefit of U.S. Provisional Application No. 61/952,803, filed Mar. 13, 2014, which is incorporated herein by reference in its entirety.

TECHNICAL FIELD

The disclosure pertains to time-of-flight distance measurement within a volume.

BACKGROUND OF THE INVENTION

Various methods are available to mechanically scan an optical beam and an associated receiver field-of-view through a region with the distance measurement based on the calculated round trip delay between the emission of a light pulse in the direction of an object and the subsequent reception of the received signal. The common approach for implementation of the scanning function is the use a mechanical steering mirror driven by an actuator to steer the beam and receiver field of view through the desired region. An alternative approach is to mount the transmitter and receiver on a moving platform such as a multiple-axis gimbals or rotary platform to accomplish this function. The transmitter and receiver can be mounted coaxially or in a parallel co-bore sited configuration depending on the requirements of the system.

The primary limitation of mechanically scanning the field of view using a steering mirror is a complex trade-off between power consumption, weight and size of the scanner, efficient use of the optical beam power and stray light rejection. The physical size of the scanning mirror needs to be sufficient to allow the passing of the transmit beam and reflected optical signal to be collected by the receiver lens. If the mirror scans a raster pattern over a rectangular field-of-view, the requirement to rapidly accelerate and decelerate the mirror increases power consumption and results in the inefficient use of the scanning time. To minimize power consumption, a fixed velocity rotational scanner can be used. An external, multiple-facet, rotating polygon mirror scanner can produce a rapid scanning pattern, but is limited to small transmit and receive apertures.

An alternative approach rotates a mirror at a 45-degree orientation to the beam about the center-axis of the transmitter and receiver to produce 360-degree coverage in a plane perpendicular to the rotational axis. This configuration allows the scanning of a larger receiver and transmit beam at the expense of a potentially undesirable by-product, the rotation of the relative position of the transmitted beam and the receiver field. When the exiting beam and receive field needs to pass through the curved optic of a cylindrical window or dome the relationship between the transmitted and received fields rotates, resulting in changing optical distortion and the potential for large amount of transmitter beam scattering into the receiver.

Published U.S. patent application US 2010/0020306A1 to David Hall describes a time-of-flight based 3-D LIDAR sensor using a rotating linear array of photo detection fields-of-view with associated laser elements for each pixel. The multiple receive signals are processed to estimate the time-of-arrival in each location. Receiver signal processing captures the received signal from individual channels allowing the subsequent extraction of the time-of-arrival using threshold detection. The goal of this configuration was to maximize the update rate number for a high number of resolution elements. The penalty paid for this design goal is high system complexity and associated cost.

U.S. Pat. No. 6,137,566 to Leonard et al. discloses a method based on individual processing channels for each detection region within a photodiode array. Because of the large number of parallel processing channels, the implementation of the pre-amplification, low resolution A/D and the need for GHz frame word rate dictates a high hardware complexity, limiting the approach to high performance military applications. This method is also inefficient when combined with low-duty cycle pulsed laser sources since the effective utilization of the receiver occurs for short durations relative to the pulse of the system.

A variety of CCD based detection methods have been disclosed to minimize the cost and complexity of detection. U.S. Pat. No. 6,906,793 to Bamji et al. illustrates a representative CCD based system consisting of the use of a modulated LED or laser source and a CCD detector array incorporating on-chip circuitry to extract the phase of the incoming signal. These CCD systems, in theory, provide virtually ideal signal integration characteristics at the expense of inefficient utilization of chip real estate due to the presence of phase mixing circuitry, the charge storage well and output shift registers. Unfortunately this method can only provide noiseless integration when the noise contribution of the background and thermal leakage currents are negligible relative to the signal shot noise. This occurs under very dark background conditions that are not achievable under outdoor and bright lighting indoors due to limitations in obtaining a sufficiently narrow optical notch filter spectral width. The optical notch filter's band pass characteristic needs to be matched to the spectral width and drift over temperature of the LED or laser source which can dictate a relatively broad band pass width. Narrow pass optical filters become inefficient and prohibitively expensive as the spectral width is reduced.

Methods and apparatus are needed that offer the simplicity and low cost potential of CCD 3-D image sensors, with the performance advantage of direct digitization of the receiver signal and consistent performance under bright background conditions.

SUMMARY OF THE INVENTION

The present disclosure, roughly described, pertains to methods and apparatus that scan a receiver field-of-view, or alternatively, an actively illuminated transmitter and receiver pair, over a region of azimuth and elevation. The system is comprised of a cylindrical housing, a photon detector and photon transmitter contained within the housing configured to produce at least two resolvable azimuth fields-of-view relative to the center-axis of an optical housing. An rotary scanner component switches between at least two elevations relative to the nominal optical axis of the receiver, wherein the photon receiver scans in azimuth to provide continuous elevation coverage.

In the primary embodiment, an optical receiver and transmitter scanner produce fields-of-view and associated beam patterns that are elongated and deviated forward in azimuth to look-ahead slightly from the nominal azimuth scanning position. An external scanner alternately selects or deviates between two or more elevation fields-of-view using an elevation step scan approach. A stepped scan would normally result in gaps in azimuth scan coverage while the receiver is viewing alternating elevation fields; with the gap in coverage governed by the number of elevation deflection segments and the effective dead zone produced as the elevation deviation facet move off a receiver or transmitter aperture. The look-ahead function avoids gaps in coverage by viewing ahead of translation based azimuth coverage using multiple detector elements or by elongating the photon detectors field-of-view in azimuth combined with the use of multiple transmit beams in azimuth to produce individually resolved fields of coverage.

In an alternative embodiment, the multiple detection fields are produced from a single photon detector by multiple receiver lenses sharing the acceptance field of the detector. The detection field of coverage may be forward oriented relative to and generally perpendicular to a detection plane or, alternatively, the separate optical fields of coverage radiate outward from a central region with a detection plane generally parallel to the plane of optical coverage. In the case of optical fields oriented around the perimeter of the housing, multiple lenses are coupled to one or more shared detectors using 90 degree folding mirrors. Detection elements may be arranged as a single column of elements or as a two dimensional rectangular array dependent on the required symmetry dictated by the lens placement.

An embodiment of the elevation scanner uses a rapidly rotating optical drum with multiple elevation deviation facets surrounding the optical housing to provide a step scanning function. With rotation, beam deviation facets within the assembly alternately shift an entire FOV of receiver in elevation to effectively multiply the vertical resolution of the overall system by the number of unique elevation facets. A single detection exposure during the overlap of a lens aperture and the moving elevation deviation allows a facet length roughly equal to the lens aperture opening. Multiple detection exposures can be used to allow an improvement in azimuth resolution, but the deviation facet length be must be increased to increase the duration of overlap between a lens aperture and the facet. Using multiple azimuth detection exposures, a larger spacing between detection elements enables individually placed detectors while monolithic arrays are typically suitable for a single exposure case.

In an alternate embodiment, multiple detection fields are produced through the use of array of interleaved beam deflector elements placed within the receiver apertures and a rotating cylindrical mask to select alternate elevation fields of view. The beam dissector can be implemented using diffractive or refractive optical elements to produce a detection field-of-view consisting of regions differing vertical deflections. A cylindrical mask consisting of alternating opaque and transmission regions rotates about the optical housing. As a mask opening passes over a beam deflection region, one of the elevation fields-of-view are selected while the other regions remain blocked.

Using an interleaved deflector and attenuation mask allows a large number of elevation step cycles per each mask rotation relative to the optical housing. The pitch of the interleaved beam deflection regions can be made arbitrarily small with eventual limitation due to degraded image quality due to diffraction effects and scattering and loss at the boarders of the deflection regions. Dependent on the desired azimuth resolution of the scan, required elevation steps and deflector/mask fabrication limitations the required rotation rate of the deflection mask may be equal to the rotation rate of the optical housing to allow the mask to anchored to the base. In this configuration rotation of the optical housing allows the simultaneous scanning of azimuth and elevation, significantly reducing the mechanical complexity of the system.

The translation of the system in azimuth may be due to direct translation of the optical housing or through rotation of the housing.

The case of pure translational movement applies to the application of the sensor as a line scanner. Line scanners are typically used in aerial surveying applications where the line scanner is oriented perpendicular to platform movement. Such systems may be passive, viewing the scene multi-spectrally, or in active illuminated LIDAR applications 3-D capture of surface features or for aerosol detection and monitoring.

For rotational scanner applications, the line scan pattern's fields-of-coverage are tangential to the rotation axis of the system. For applications requiring full 360 degrees azimuth coverage, such as for robotic navigation, continuous rotation of the housing may be desirable. For continuous rotation, placement of the multiple lenses sharing a center oriented detector array offers reduced system complexity or for field update rates higher than the rotation rate of the system. Typical frame update rates of 10 cycles per second dictate housing rotation rates of 600 rpm or greater. For applications requiring less than 180 degrees of coverage, the housing may be nutated side-to-side or using multiple apertures around the perimeter of the housing, sweeps of 90 or 180 degrees can be accommodated.

Aspects of the present invention can be accomplished using hardware, software, or a combination of both hardware and software. The software for the present invention is stored on one or more processor reliable storage media such as in RAM, ROM or hard disk drives. In alternative embodiments, some or all of the software can be replaced by dedicated hardware including custom integrated circuits, gate arrays, FPGAs, PLDs, and special purpose computers.

BRIEF DESCRIPTION OF THE DRAWINGS

FIG. 2B illustrates calculation of required scanner rotation and receiver azimuth scan rate due to translation of the optical axis.

DETAILED DESCRIPTION

Figure 1:
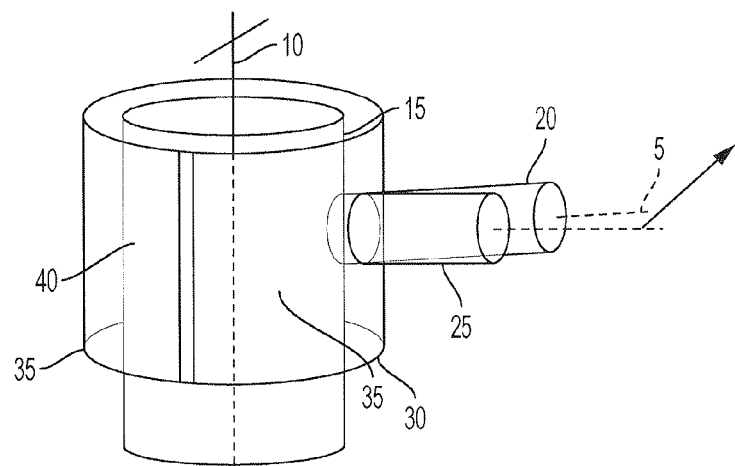
FIG. 1 is a schematic drawing of a cylindrical shaped optical scanner receiver with external beam deflector.

FIG. 1 illustrates a generic embodiment of a cylindrical shaped optical scanner receiver with external beam deflector. Inter housing 15, is shown with a central-axis 10. Two optical receive fields labeled 20 and 25 are displaced in azimuth in order to provide a look-ahead function to fill in coverage gaps resulting when external scanner component 30, selects alternating regions of elevation. Elevation deflection produced from regions 35 and 40 may be constructed using diffractive or refractive optics or in an alternate embodiment by an opaque mask used selectively block a range of elevation coverage. Although two separate elevation selection levels are shown, any number of elevation regions may be implemented based on the circumference of the scanner and the number of elevation scans per rotation.

Figure 2:
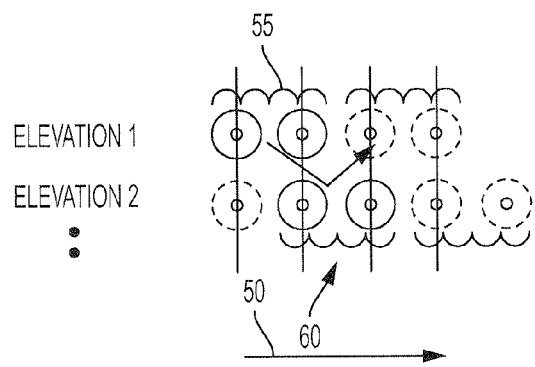
FIG. 2 illustrates receiver field-of view coverage with continuous lateral motion of the optical axis.

FIG. 2 illustrates receiver field-of view coverage projected onto a plane due continuous lateral motion of the receiver optical axis. Two scanner elevations are illustrated along the vertical axis of the drawing while the horizontal axis 50 represents field-of-view (FOV) displacement due to housing motion in addition to electronic azimuth scanning of the receiver. Receiver FOV projection 55 shows two receiver fields displaced slightly in azimuth. In this example only one pair of receiver dwells occurs per ½ rotation of the scanner. Projection 60 illustrates the next receiver dwell at a second elevation. The elevation fields are separated uniformly, indicating that the elevation scanner rotation rate is synchronized to the field-of-view translation produced from the angular separation receiver fields.

FIG. 2B shows two basic equations for calculating of required scanner rotation and receiver azimuth scan rate based on translation of the optical axis. Translation can be due to rotation about the center axis of the housing or due to linear translation of the system in azimuth. Rotation of the housing offers the simplest analysis case which is solved using equation (1a). $\Theta_{offset}$ is the azimuth angular offset in degrees between receiver field-of-views, $\omega_{housing}$ is the angular rotation rate of the housing, and $\omega_{scanner}$ is the required rotation rate for the external scanner. For linear translation of the housing, a case encountered when applying the system as an aerial scanner, equation (1b) is shown. $v_{housing}$ is the translational velocity in meters/sec, ALT is the nominal sensor altitude in meters. For the case of linear motion, the density of samples is a function of altitude requiring a variable scanner rotation rate to maintain roughly uniform spatial sampling of the field.

Figure 3:
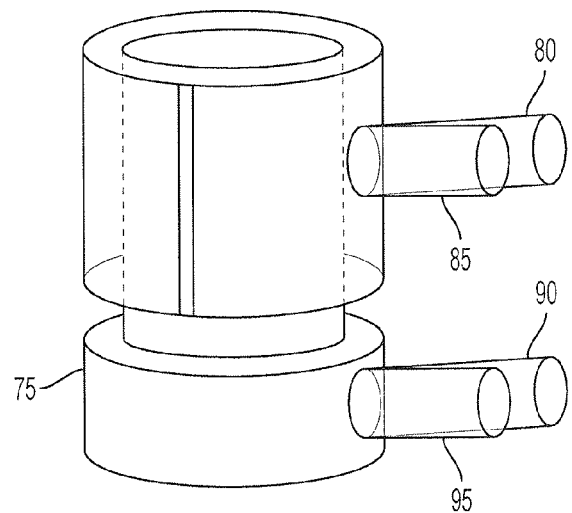
FIG. 3 illustrates a simplified optical system with a co-aligned transmitter function.

For LIDAR and other applications requiring active illumination of the receiver field-of-view, an optical transmitter aligned to the receiver is required. FIG. 3 shows a system with the addition of a co-aligned transmitter function. Receiver fields-of-view 80 and 85 are coupled to transmit fields 90 and 95 respectively. The optical housing 75 is lengthened to accommodate the transmit optics and electronics.

Figure 4:
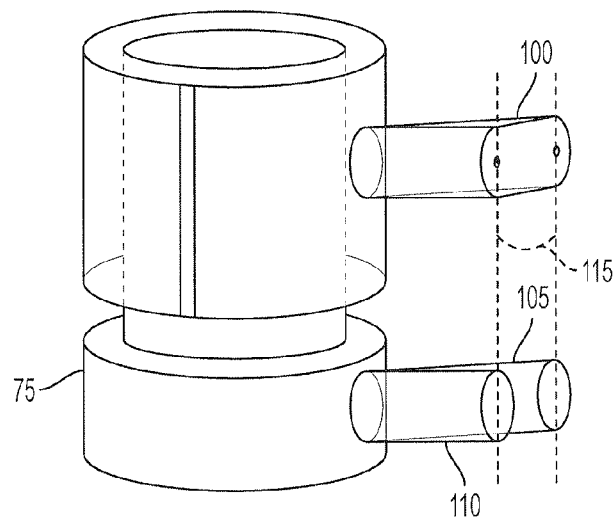
FIG. 4 illustrates two or more azimuthally separated photon receiver fields-of-view created by using a single photon detector and with separate optical transmitters.

FIG. 4 shows of two or more azimuthally separated photon receiver fields-of-view created by using a single photon detector with separately actuated optical transmitters. A receiver field-of-view 100 is elongated by an azimuth angular offset 115. Two separate transmitter beams 105 and 110 are aligned in elevation and azimuth to overlap to the receiver FOV for objects over the desired range window.

Figure 5A:
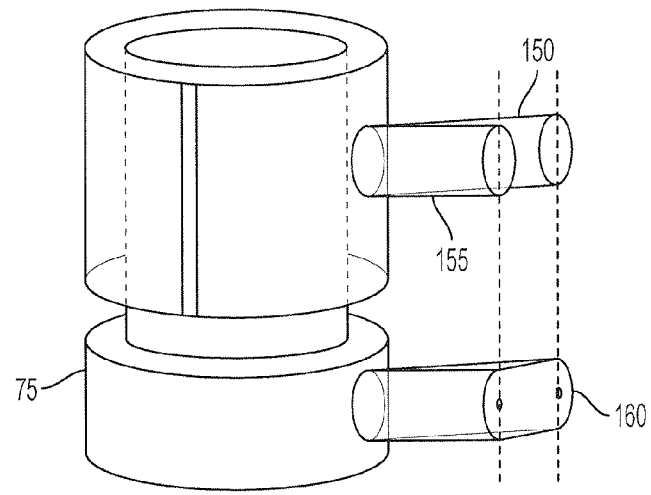
FIGS. 5A-5C illustrates using separate photo detectors and a shared transmit field to provide separated photon receiver fields-of-view.
Figure 5B:
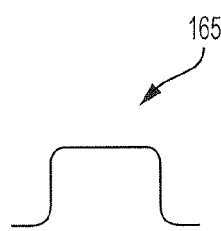
Figure 5C:
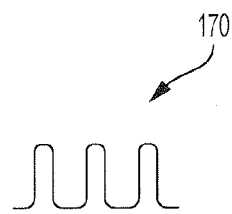

FIGS. 5A-5B show the use of separate photo detectors with a shared transmit field providing separated receiver fields-of-view with reduced complexity in the transmitter. Two FOV 150 and 155 are produced from two separate photon detectors to allow simultaneous operation. The overlapping transmitter beam illuminates both detector FOVs and can be shaped as a continuous fan profile 165 or as comb pattern 170.

Figure 6:
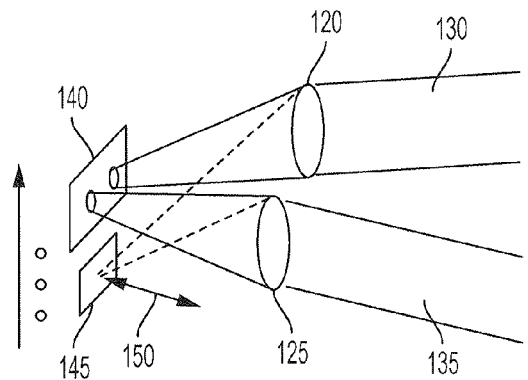
FIG. 6 illustrates two lenses sharing a detector coupled to increase field-of-view coverage.

FIG. 6 shows an example of two lenses sharing a detector coupled to increase field-of-view coverage. Detector 140 is coupled to lenses 120 and 125 to produce two simultaneous fields-of-view 130 and 135 respectively. The optical axes of the lenses are offset to produce these two separate fields-of-view. Detector 145 and associated converging optical fields 150 are shown to illustrate using additional detectors to multiply the field.

Figure 7:
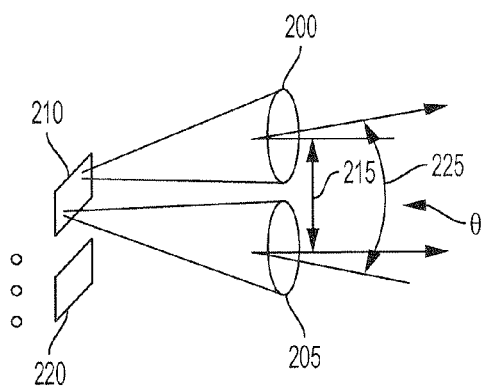
FIG. 7 illustrates a detector coupled to two lenses offset in elevation to increase elevation coverage.

FIG. 7 illustrates a single detector coupled to two lenses. Offset in elevation to increase elevation coverage, detector 210 is coupled to lenses 200 and 215 produces two simultaneous fields-of-view offset by 205 resulting in angle θ 225. The offset in the optical axis of the lenses to produce two FOV thereby increases the resolution in elevation. Additional detectors such as detector 220 can be produced having associated converging optical fields that multiply the elevation field.

Figure 8:
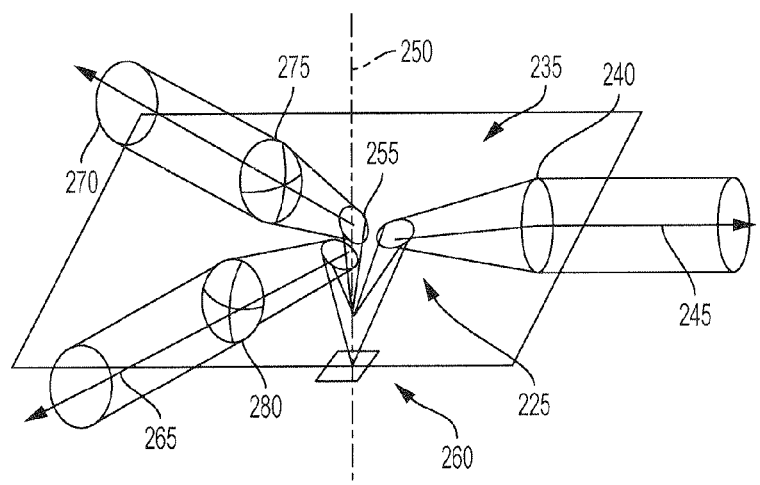
FIG. 8 illustrates multiple lenses arranged to provide azimuth coverage greater than 180 degrees.

FIG. 8 is shown to illustrate the use of multiple lenses arranged to provide azimuth coverage greater than 180 degrees. Lenses 240, 280 and 275 and associated optical axes 245, 265 and 270 radiating from a center axis 250 of the detector assembly are contained within plane 235. Folding mirror assembly 225 rotates the lens optical paths by roughly 90 degrees to allow illumination of detector 260 which is generally parallel to a plane containing the lens optical axis. Locating receiver lenses along the periphery of the housing is a useful to improve azimuth or elevation coverage in rotational scanners requiring up to 360 degrees of azimuth coverage. This technique can also allow increased elevation coverage if the optical axis of one or more lenses is offset from the nominal plane containing the other optical axes.

Figure 9:
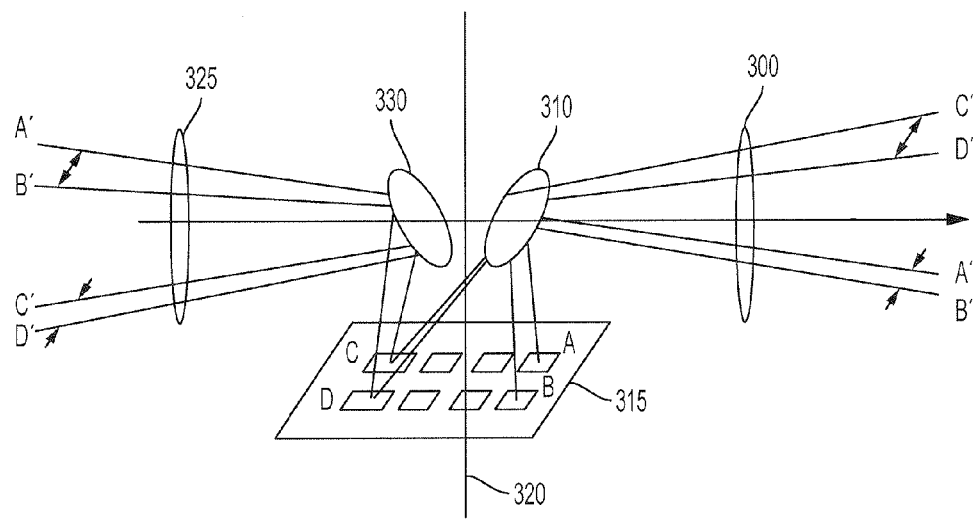
FIG. 9 illustrates a non-symmetrical matrix of photon detectors with two equidistant focusing lenses oriented 180 degrees apart.

FIG. 9 illustrates the use a non-symmetrical matrix of photon detectors 315 with two equidistant lenses 300 and 325 oriented 180 degrees apart. The detector array X or Y axes need to be parallel to the center axis of the lenses in order for the fields-of-views produced to be symmetrical. Folding mirrors 310, 330 fold the optical axis of the lenses so that they are coincident with the crossing of the center-axis of the array 320 and a detection plane defined by the photon detectors 315. A 2-by-4 element detector is shown with the end detectors labeled A through D.

Shown on the left and right sides of the figure, projections of the detector fields are shown with labeled A' through D'. It can be seen the field-of-views produced from the detector and lens combinations are inverted in the vertical axis.

Figure 10:
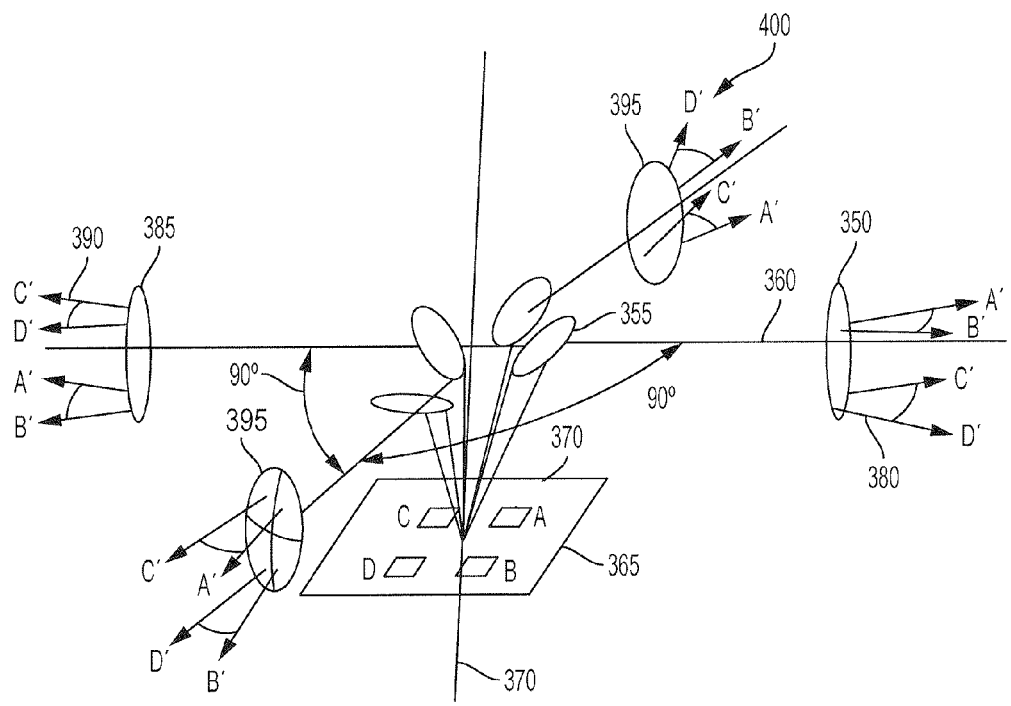
FIG. 10 illustrates use of a symmetrical M by M array and four lenses oriented 90 degrees apart.

FIG. 10 illustrates the use of a symmetrical M by M array with four lenses 350, 385, 395 and 400, with optical axes oriented 90 degrees apart. A folding mirror assembly 355 folds the optical-axis of the lenses so that they are coincident with the crossing of the center-axis of the array and a detection plane 365. A 2-by-2 element detector array 370 is shown with detectors labeled A through D. A symmetrical array is necessary to allow the lens FOV projections of the detector array to remain symmetric with respect to each other. Projections of the detector fields are shown at the four lenses labeled A' through D'. The orientations of fields-of-view produced from the projection of the detector array 370, relative to lens 350 are rotated 90 degrees at lens 395, 180 degrees at lens 385 and 270 degrees at lens 460. The rotation of the detection field requires that the signal outputs be associated with the correct receiver fields-of-view as the detector signals from successive lens apertures are represented by directional vector sets 380, 390 and 395.

Figure 11:
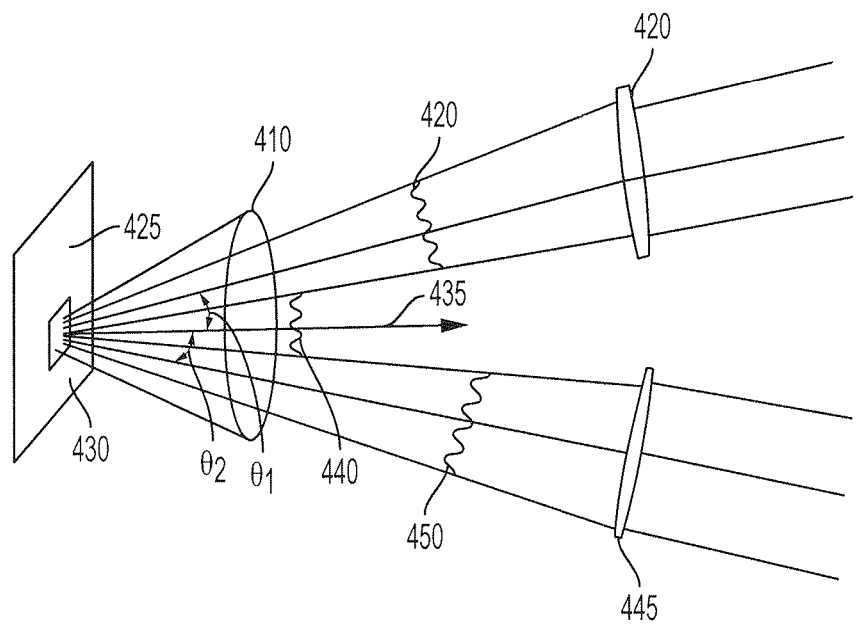
FIG. 11 illustrates multiple focusing lenses within the acceptance solid angle of a detector.

FIG. 11 shows multiple focusing lenses 420, 445 with optical axes radiating from the center of a detector 430 mounted on detection plane 425. Converging ray bundles 420 and 450 must be within the acceptance solid angle 410 of the detector in order to maintain efficient coupling. The ray bundles are offset off the center axis 435 by an angular separation 440.

Figure 12:
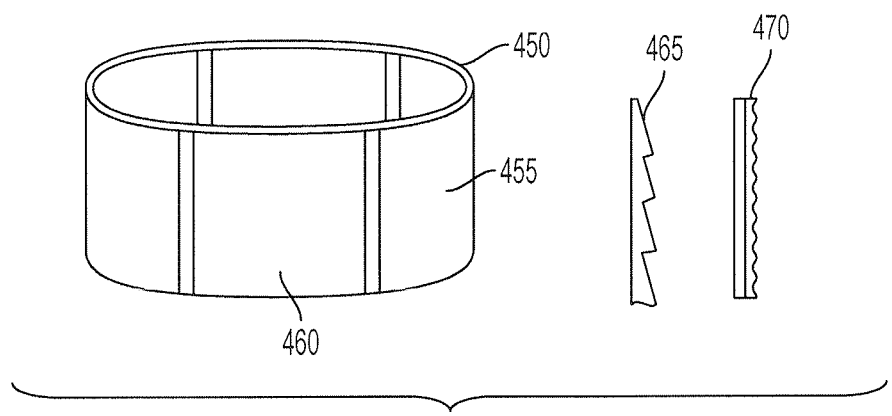
FIG. 12 illustrates a rotary scanner drum based on beam deflection.

A detail of a rotary scanner based on beam deflection is shown in FIG. 12. The cylindrical optical assembly 450 is comprised of a series of diffractive or refractive beam deviation segments 455, 460 evenly distributed around the perimeter of cylindrical drum. An example drum cross-sections are shown for a refractive prism 465 and diffractive 470 optical structures. Both the refractive and diffractive optical surfaces may be fabricated as a thin plastic film and glued to the inner surface of a solid plastic or glass cylinder. Due to the need to rapidly rotate the scanner drum, a rigid structure and dynamic balancing are required. A rotation rate above twenty thousand RPM is required for most high spatial resolution scanner applications.

Figure 13:
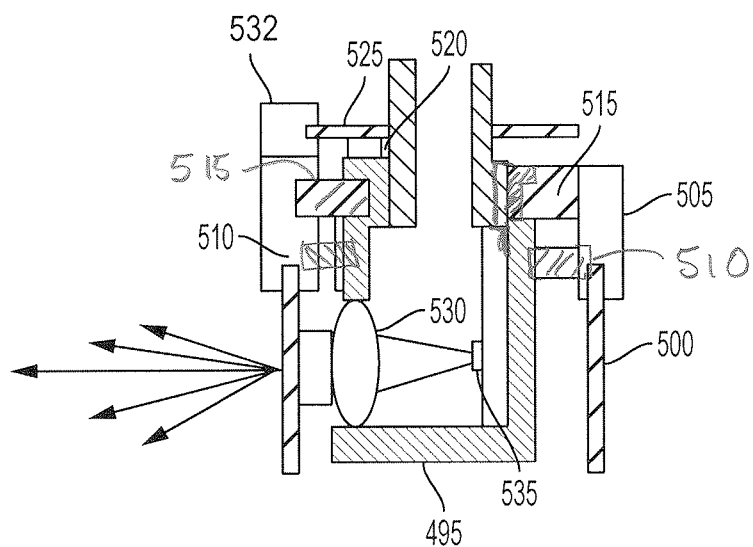
FIG. 13 illustrates a mechanical cross-section for the rotary scanner mounted to the optical housing.

FIG. 13 shows a mechanical cross-section for a rotary scanner mounted to the optical housing. An optical housing 495 is attached to a scanner housing 505 using one or more sets of rotary bearings 510. A frameless rotary motor 515 is anchored to the optical and scanner housings with an acceptable gap maintained through the bearings. A rotary position encoder consists of an encoder disk 525 and an optical or electromagnetic position sensor 520. An optical scanner drum 500 is rigidly attached to the scanner housing. Lens 530 and receiver detector 535 view through a scanner drum 500.

During facet alignment, multiple sets of detector dwells can be used. Multiple exposures can increase the number of resolvable azimuth elements or to reduce the number of detectors required. Typically the elevation deflection facet is significantly larger than a lens aperture allowing the potential for obtaining more than one set of measurements per facet crossing.

Figure 14:
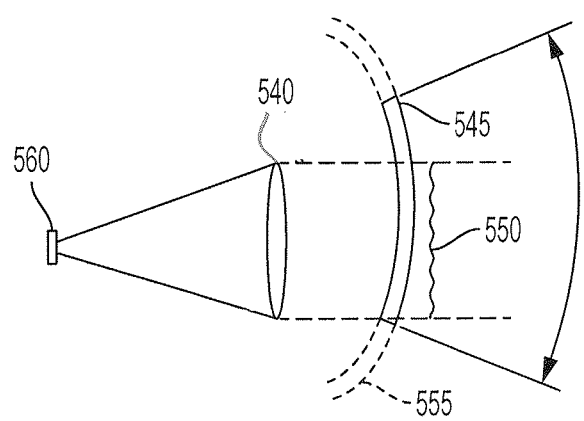
FIG. 14 illustrates an elevation deflection facet passing over a lens aperture.

FIG. 14 shows an elevation deflection facet passing over a lens aperture. Lens 540 produces a converging beam to detector 560. An elevation deflector 545, covering a portion of scanner drum 555, passes in front of the lens with a region 550 representing the circumference of the projection of the receiver FOV. An overlap factor can be considered representing the percentage of an elevation cycle utilized as follows:

Factor=(circumference of the elevation facet−FOV projection)/(the circumference of the elevation facet)*100

A higher Factor value indicates that more time is available during a facet crossing, reducing the amount of look ahead required to fill in the pattern.

Figure 15:
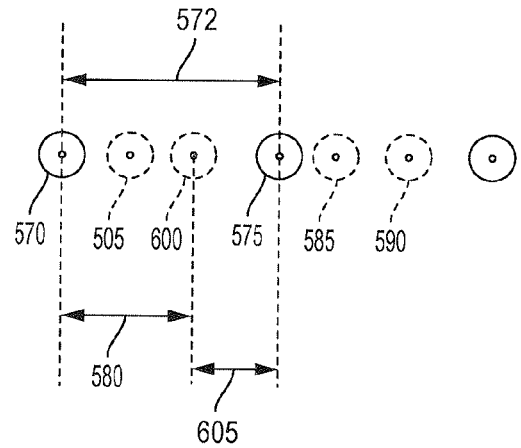
FIG. 15 is an example of multiple sets of receiver exposures during an elevation scanner facet overlap.

FIG. 15 shows an example of multiple sets of receiver exposures during an elevation scanner facet overlap. Receiver detector FOVs 570 and 575 are the first projection of a single pair of azimuth receiver exposures with an angular separation 572. A second and third series of exposures are shown as dotted line circular fields 505, 585 and 600, 590, respectively. The angle of housing rotation during the exposure period is given by a separation 580 while a maximum dead zone while the next elevation facet moves into place in front of the receiver aperture is denoted as 605. The required minimum overlap factor in this example is ⅔ or 67%. This would correspond to a ratio between the receiver lens to facet sector length of 1:3. The advantage of using multiple exposures in this example is roughly a 3:1 reduction in the number of receiver detectors or a corresponding reduction in the rotation rate of the elevation scanner of 3:1.

Figure 16:
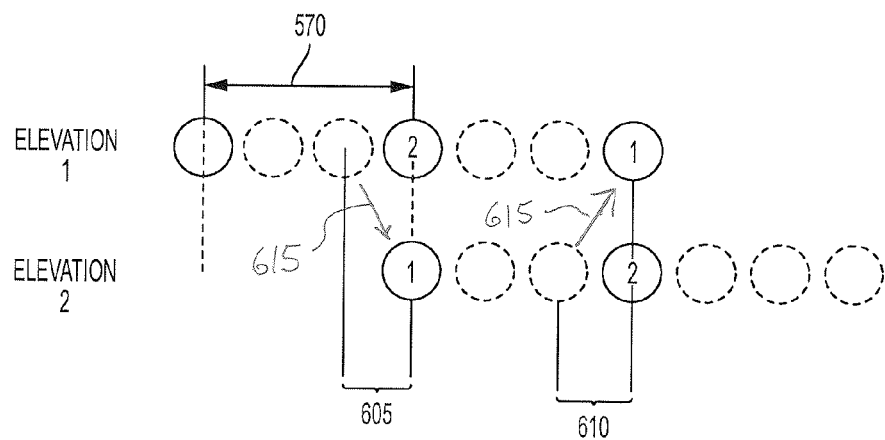
FIG. 16 illustrates receiver field-of view coverage at two elevations using multiple sets of detector exposures.

Receiver field-of view coverage at two elevations using multiple detector exposures is shown in FIG. 16. Assuming continuous lateral or rotational motion of the optical axis, field-of-view coverage is shown at the two elevations. The translation gap between elevations 1 and 2 is 605 and the transition from 2 to 1 is 610. The azimuth fields are labeled 1 and 2. Angled arrows 615 indicate the transition between elevations.

Figure 17:
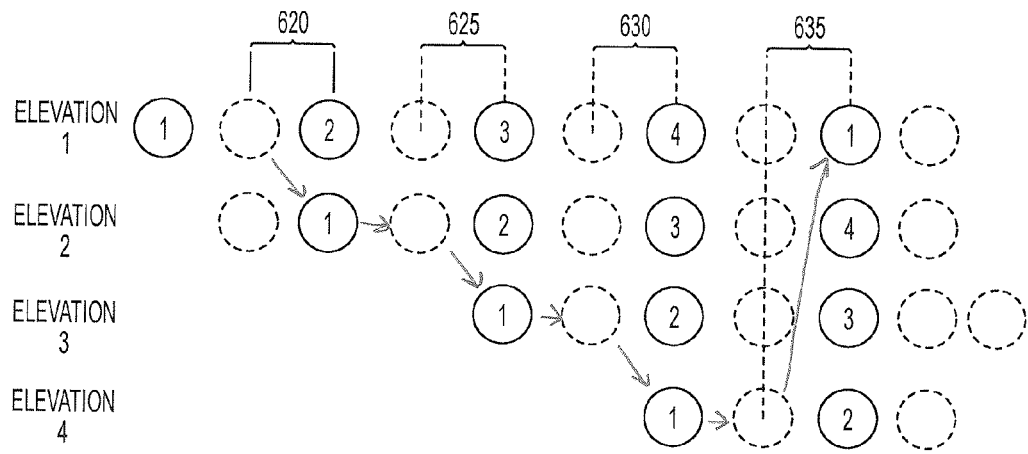
FIG. 17 illustrates a four facet elevation scanner with four azimuth receiver fields-of-view.

FIG. 17 illustrates the case of four facet elevation scanner with four azimuth receiver fields-of-view. The transition periods between elevations are shown as labeled regions 620, 625, 630, 635. For added clarity, horizontal arrows indicate translation within an elevation while the angled arrows indicate a transition from one elevation segment to another. The number required of azimuthally separate detector fields in needs to be equal to the number of elevation facets in order for uniform coverage. In the case of a receiver with a single field of coverage, the receiver is coupled with a transmit function with a number of individually selectable optical sources in azimuth equal to the number of elevation facets.

Figure 18:
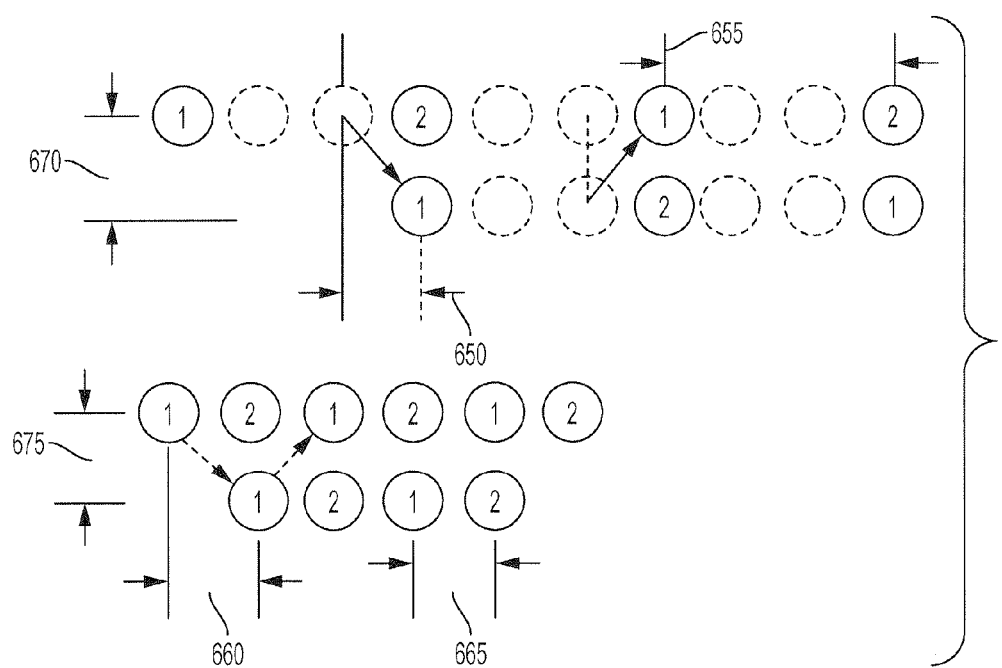
FIG. 18 is an illustrative comparison between two elevation scanners; one with three measurements per elevation verses a single dwell per elevation.

FIG. 18 provides an illustrative comparison between two elevation scanners; one with three measurements per elevation dwell verses a single dwell with a repeating pattern with three times the number of facets. The top of the figure represents the case of multiple dwells per facet while the bottom portion reflects the case of a single dwell. The azimuth separation between detectors in the multiple dwell case is 655 verses 665 for the separation in the single dwell case. Elevation steps 670 and 675 represent the elevation change from the external scanner for the multiple and single dwell cases respectively. The transition regions labeled 650 and 660 are assumed to be equal in the two cases.

For the single dwell case, the azimuth detector separation is three times smaller than for the multiple dwells case making this approach appropriate for monolithic two dimension detector arrays where minimal gap is desired between detector elements. The elevation scanner step size would typically be roughly equal to the angle covered by the full elevation axis of the array so that there is roughly equal azimuth and elevation resolution.

For the multiple exposure case, the larger detector azimuth separation makes it practical to die attach individual detector elements to the detection plane. The larger separation in elevation would dictate smaller external scanner elevation step sizes in to order to fill-in elements to provide equivalent resolution in the azimuth and elevation.

Figure 19:
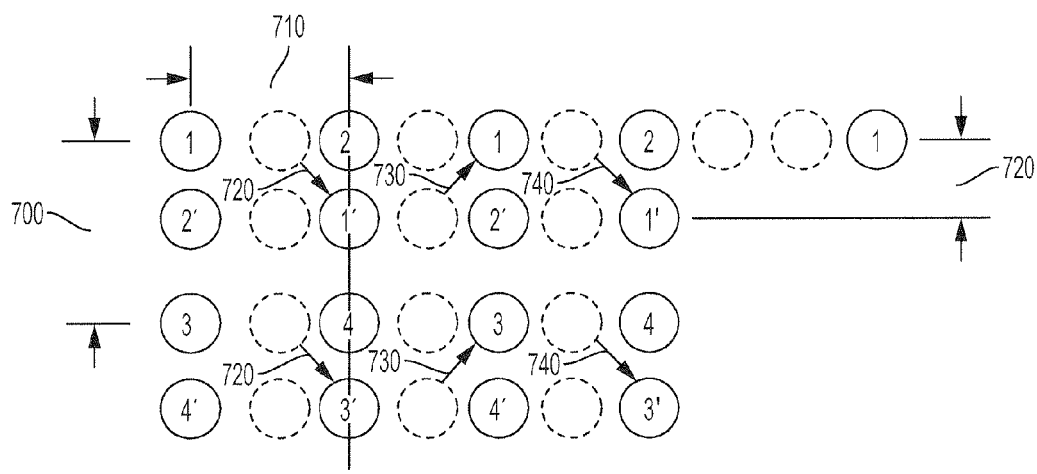
FIG. 19 illustrates two-by-two photo detector array with two azimuth scans per dwell and two separate elevation facet steps from the external scanner.

FIG. 19 shows the case of a two-by-two photo detector array with two azimuth scans per dwell and two separate elevation facet steps from the external scanner. The separations between the detector elements are equal in the horizontal and elevation axes and are denoted 710 and 700. Four elements are labeled 1-4 with left upper corner shown as element 1. The first transition from the upper elevation to the lower is shown as arrow 720 and the third as 740. The transition from the lower to the upper elevation is shown as 730. It can be seen that the two detector rows becomes multiplied by two to form four continuous elevation levels. The elevation step 720 is ½ the detector vertical separation to provide finer elevation coverage.

The combination of multiple receiver fields onto one detector or the use of detector multiplexing to share a processing signal channel places limitations on the beam patterns for active illumination. To minimize the number of required light sources, diffractive or refractive beam splitters can be used to provide multiple beams from a single light source. Beam orientation, beam divergence and the number of beams generated from a given source are dependent on the detector array geometry, effective detector size and the number of lenses and their orientation within the housing.

Figure 20:
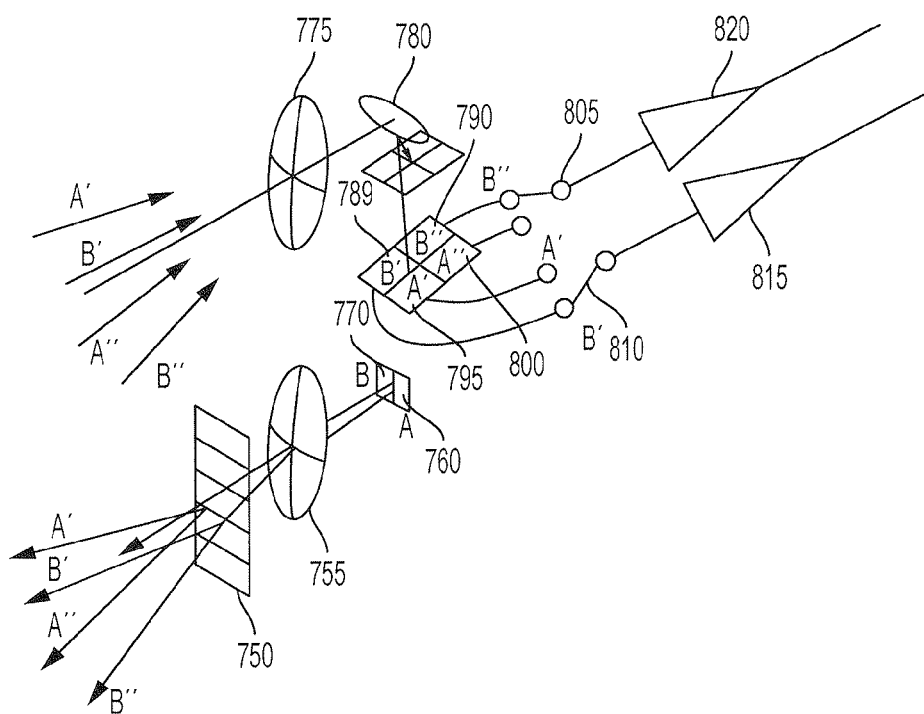
FIG. 20 illustrates illumination of a two-by-two element detection array with four beams generated from two optical sources and 1:2 beam splitter.

FIG. 20 shows an example of illuminating a two-by-two element detection array with four beams generated from two optical sources and 1:2 beam splitter. Optical sources 760 with beam reference designation A and 770 with designation B illuminate collimating lens 755 producing two beams separated in azimuth. The beams are split in the elevation axis by beam splitter 750 into a four beam pattern consisting of A', A'', B', B''. Reflected energy from the far field is collected by lens 775 producing a converging beam folded towards a 2-by-2 detector array. Detectors 789, 790, 795 and 800 are labeled reflecting the beam illumination with designations B', B'', A' and A'' respectively. Detector outputs feed to two electronically controlled analog switches 805 and 810 into common processing channels 815 and 820. The orientation of the beam splitter is selected to limit data loss associated with illumination of an inactive detector channel.

Figure 21:
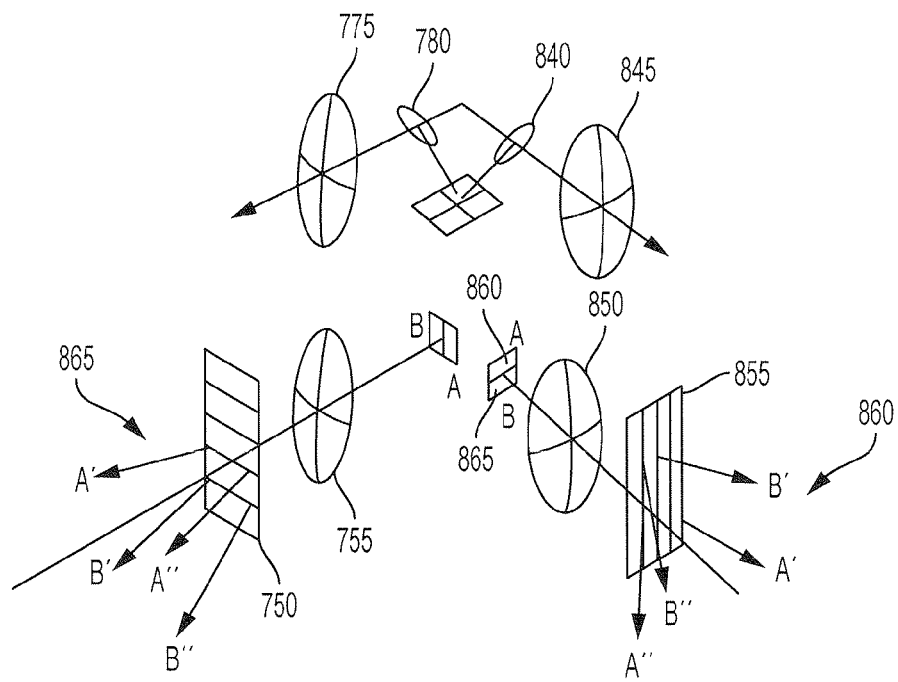
FIG. 21 illustrates a 2-by-2 detection array with the addition of a second receiver lens, folding optic and associated transmit beam channel.

FIG. 21 shows a two-by-two element detection array with the addition of a second receiver lens, folding optic and associated transmit beam channel. Lens 845 and associated folding optic 840 are orthogonal to the previous optical axis and detector elements 775, 785,790 and 800 introduced in FIG. 20. An orthogonal lens orientation results in the rotation of the detector array field-of-view 90 degrees dictating an associated rotation of the transmit field. To accommodate rotation, optical emitters 860 and 865 are placed in a vertical orientation and so lens 850 produces two independent beams in elevation. Beam splitter 855 is rotated from a beam splitter 750 and focused by lens 755 to produce two beams in azimuth resulting in 4 beams with a rotated orientation.

Figure 22:
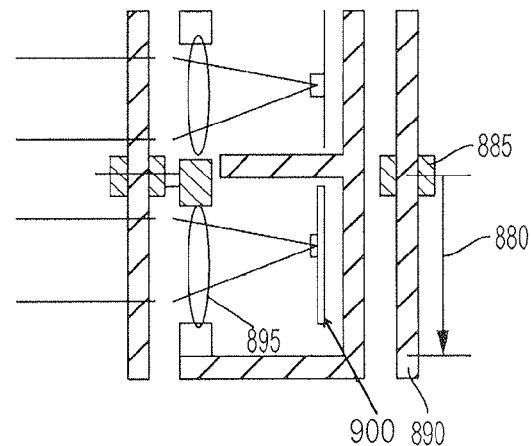
FIG. 22 illustrates a representative cross-section of a housing and scanner extended for coverage of both transmit and receive apertures.

Extension of the elevation scanner facets over the transmit aperture allows a set of transmit beams to follow the associated receiver FOV scanning. FIG. 22 shows an example cross-section of a housing 890 and scanner extended in length by 880 to cover both transmit and receive apertures. Transmit lens 895 is illuminated by one or more optical sources mounted on transmitter PCB 900. To prevent optical cross-talk between the transmitter and receiver an optical blocking ring 885 forming a labyrinth seal with the housing isolates two portions of the elevation facet. The blocking ring may be adhesive attached to the inside of the elevation single piece scanner optic or it may be form an attachment between separate receiver and transmitter beam deflection cylinders. It also may be desirable to replace the labyrinth seal with a rotary bearing attaching to the ring and housing.

The primary disadvantage of using an external beam deflector is the typical requirement for a high rotation rate to provide high azimuth resolution. The high rotation rate is dictated due to the relatively small number of elevation facets that can be accommodated along the scanner drum perimeter. The disadvantages of a rapidly rotating scanner are increased mechanical complexity, large power consumption and gyroscopic effects in a dynamic environment. A more desirable solution for most applications would be a rotating elevation scanner that effectively offers a large number of elevation facets.

Figure 23:
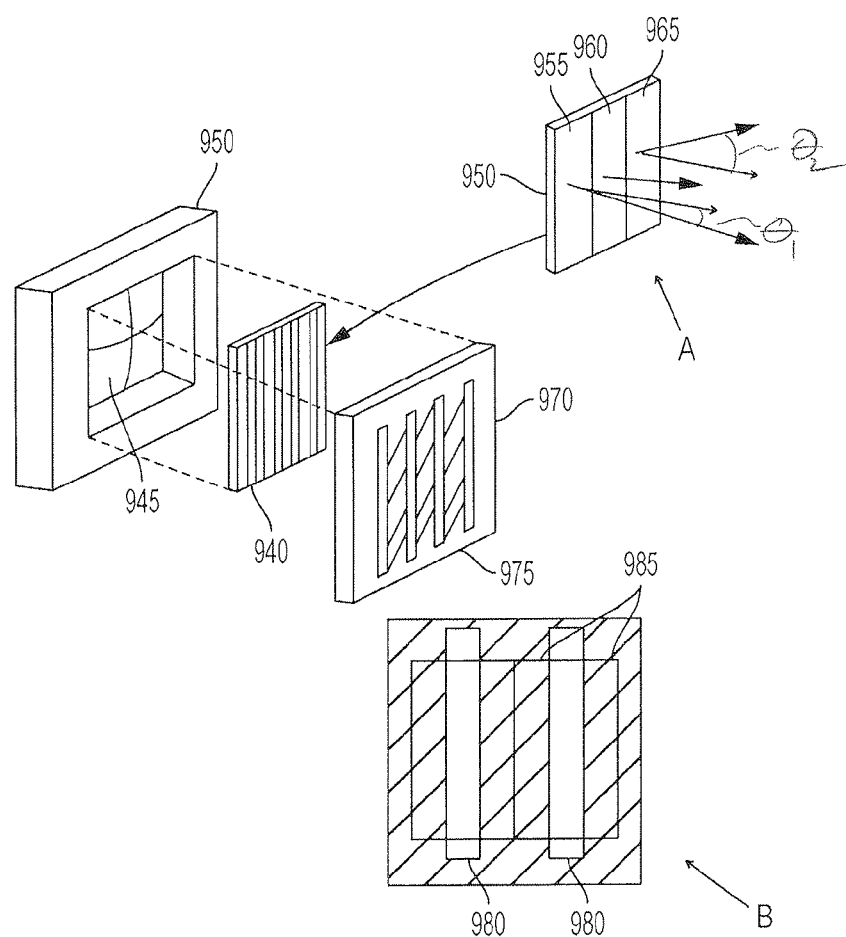
FIG. 23 illustrates an elevation scanner with fixed elevation deflectors providing multiple fields of elevation coverage using a rotary field selection optic.

FIG. 23 shows an elevation scanner approach with fixed elevation deflectors providing multiple fields of elevation coverage using a rotary field selection optic. A segmented elevation deflector 940 is fixed in the entrance aperture 950 of a photon receiver lens 945. Detail A illustrates a portion of a periodic series of vertically oriented diffractive or refractive elevation deflection optics. Shifts in elevation shown as deviation angles $\theta_1$ and $\theta_2$ corresponds to elevation facets 955 and 965 respectively. Facet 960 is shown without deviation. A cylindrical mask 970 provides a pattern of repeating vertical slits 975 of alternating transmission and attenuation regions. Detail B shows the overlay of the mask transmission pattern 980 and the matched to the periodicity and orientation of the fixed beam deflector pattern 985. As the cylindrical mask is rotated about the center axis of the housing, one elevation field at a time is periodically selected.

Figure 24:
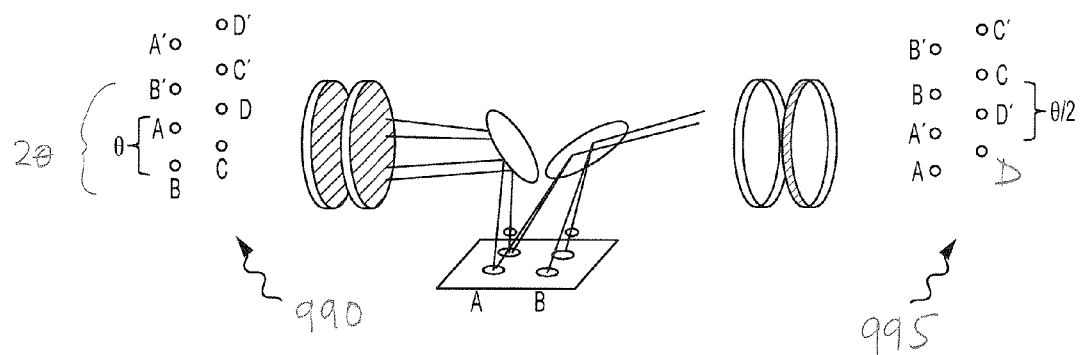
FIG. 24 illustrates two lens apertures having different sets of elevation deflectors and sharing a common detector array.

Unique elevation deviation elements may be used in each receive lens aperture to provide more flexibility to tailor the scan pattern. FIG. 24 illustrates two lens apertures with two different sets of elevation deflectors sharing a common two by two detector array. Beam pattern 990 as an elevation shift twice the detector separation $\theta$. Far field pattern 995 illustrates a shift ½ the detector separation. In a given application it may be desirable to provide different resolutions over region of elevation such as in a rotational scanner for robotics navigation.

The placement of a segmented beam deflector in the receiver invariably results in significant path loss since only a portion of the receive aperture is used for each selected elevation. Much of this loss can be compensated for by enlarging the lens area to fill a greater portion of the available sensor housing cross-section. The pitch of the beam deflector and associated mask pattern can be selected to allow the external scanner to remain fixed relative to a rotating internal housing.

Figure 25:
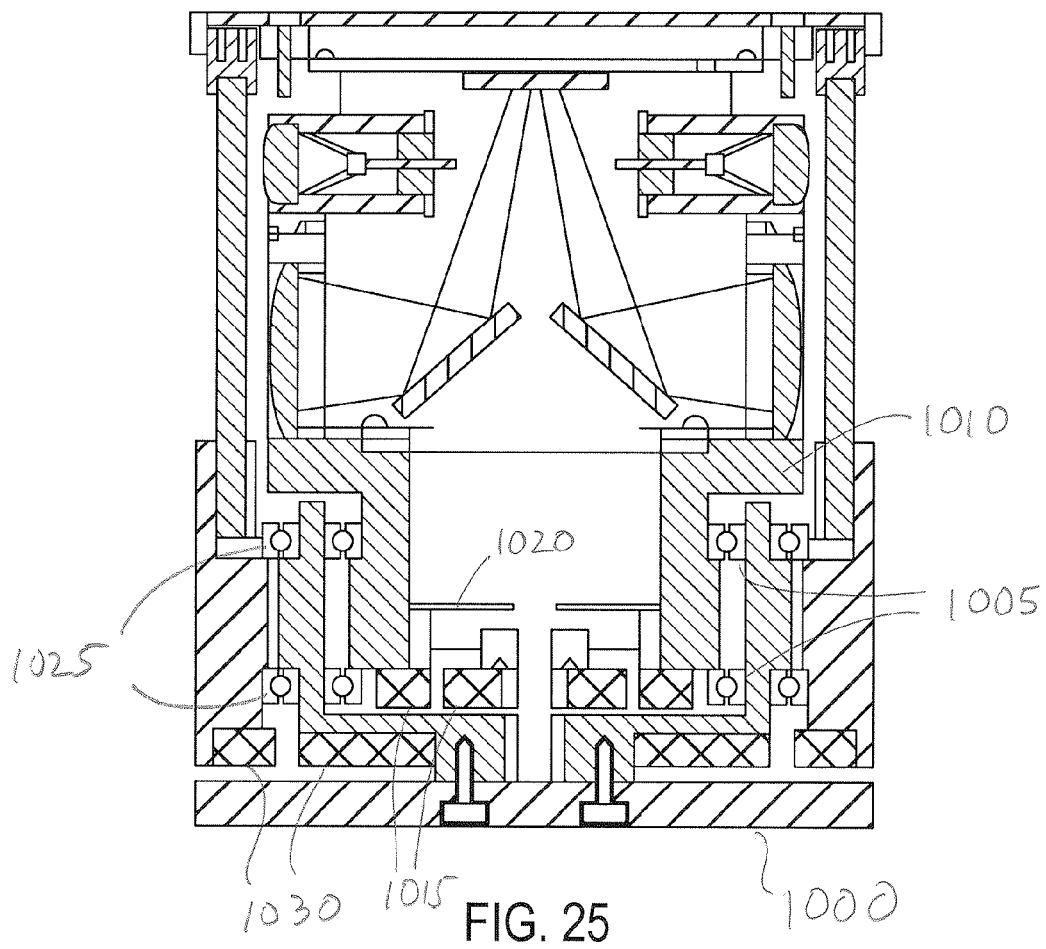
FIG. 25 illustrates an example mechanical cross-section of a rotating sensor housing.

FIG. 25 shows an example mechanical cross-section of a rotating sensor housing. Mounting base 1000 attaches the sensor to stable, non-resonate structure on a fixed or moving platform. One or more rotary bearings 1005 support an optical housing extension 1010 which is fixed to the housing. A frameless motor rotary motor 1015, situated between the housing and base, provides fixed or variable rotational rate for the housing relative to the base. A position detector 1020 provides at least on indication of the absolute position of the housing relative to the base during rotation. Power is applied across the rotary interface with a slip ring set. A pair of optical digital transceivers, one mounted on the base and a second attached to the housing provides bidirectional digital communications. A second pair of bearings 1025 suspends the external elevation scanner housing with rotation provided by a frameless motor 1030. Optical encoder and associated encoder disk not shown would typically provide rotational position feedback of the elevation scanner drum relative to the mounting base.

Figure 26:
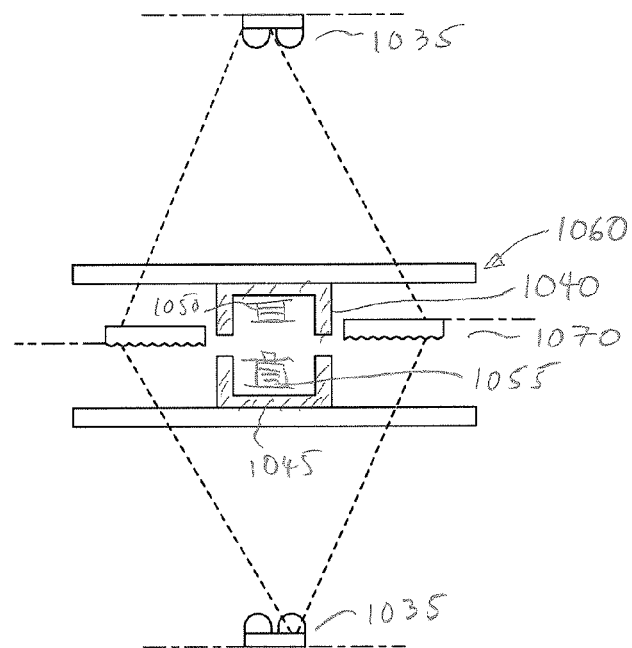
FIG. 26 illustrates an inductive power coupling using a cup transformer accommodating the use of a bi-directional optical transceiver for communications.

FIG. 26 shows a mechanical cross-section of an inductive power coupling using a pot core transformer that accommodates the use of optical transceivers 1035 for communications. Upper 1040 and lower 1045 pot core halves have associated secondary and primary winding bobbins 1050, 1055 respectively. Top and bottom PC boards 1060, 1065 respectively (shown in FIG. 27) support the pot cores, provide space for circuitry and allow light transmission outside the central core mounting region. A Fresnel lens 1070 placed between the PC boards redirects light passing past the first board back towards the central optical axis of the assembly. The focal length of the Fresnel lens should be \roughly twice the operating distance between the lens and the transceiver.

Attached to the primary winding is a switching power supply providing fixed frequency excitation at roughly a 50% duty cycle to prevent asymmetrical flux and potentially saturation of the core. On the secondary winding is voltage rectifier to provide a DC voltage to the electronics in the housing.

Figure 27:
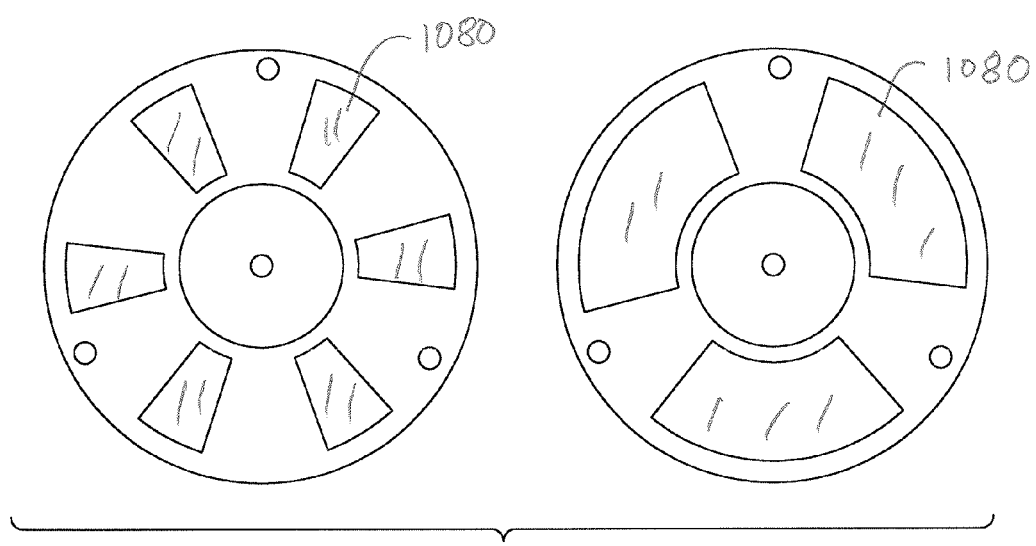
FIG. 27 is a top view of representative pot core PC boards detailing openings that provide optical transmission.

Light is allowed to pass around the outside of the pot cores through outer openings in a spider support structure on the support PC boards. The upper PC board mount is fixed to the optical housing while the lower PC board attaches to the base. A top view of the periodic gap between supporting spiders is shown in FIG. 27. These openings 1080 allow a sufficient amount of light to pass through the pair of support PC boards. There will be a periodic pattern of beam intensity reduction with rotation of the housing; however the optical transceiver electronics can accommodate this as long as there is sufficient signal strength.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. I therefore claim as my invention all that comes within the scope and spirit of the appended claims

I claim:

1. An optical scanner system comprising:
a housing;
a detector contained within the housing configured to produce at least two resolvable azimuth fields-of-view relative to a center-axis of the housing, the detector being a matrix of detectors positioned in a non-symmetrical array; and
an external scanner rotatable relative to the center-axis of the housing switching between at least two elevations relative to a nominal optical axis of the detector, wherein motion of the housing azimuthally results in the detector producing a continuous coverage pattern at multiple elevations;
wherein a received light flux from two or more lenses is coupled to the detector, the optical axis of the two or more lenses radiating from the center of the detector, contained in one or more planes parallel to a detection plane, and coincident and co-linear with a center of the non-symmetrical array; and
wherein a folding mirror is situated to rotate lens optical paths by about 90 degrees.

2. A system according to claim 1, further comprising an optical transmitter that produces one or more beams aligned to illuminate at least one receiver field-of-view.

3. A system according to claim 2, wherein two or more azimuthally separated fields-of-view are produced by the detector and the optical transmitter.

4. A system according to claim 1, wherein the lenses are offset in elevation to increase elevation coverage of the continuous coverage pattern.

5. A system according to claim 1, wherein the optical axes of the two or more lenses are situated about the center of the detector and are substantially perpendicular to a plane in which the detector is mounted.

6. A system according to claim 1, wherein the external scanner is a cylindrical drum including a series of diffractive or refractive beam deviation prisms distributed uniformly around the perimeter of the cylindrical drum.

7. A system according to claim 2, wherein the external scanner is elongated to a provide elevation deviation steps for both the receiver and transmit fields of coverage.

8. An optical scanner comprising:
a housing;
a detector contained within the housing configured to produce at least two resolvable azimuth fields-of-view relative to center-axis of the housing;
an external scanner rotatable relative to the center-axis of the housing switching between at least two elevations relative to a nominal optical axis of the detector, the external scanner being;
a mounting base;
a rotary bearing;
a motor coupled to a cylindrical drum to provide a fixed rotational rate of the housing relative to the mounting base; and
a position detector situated to provide at least one indication of a position of the housing relative to the mounting base during a rotation;
wherein motion of the housing azimuthally results in the detector producing a continuous coverage pattern at multiple elevations; and
wherein the cylindrical drum includes a series of diffractive or refractive beam deviation prisms distributed uniformly around the perimeter of the cylindrical drum.

9. A system according to claim 8, wherein a number of elevation steps of the external scanner and an effective pitch of azimuthal coverage provide a rotation rate of the external scanner that is substantially equal to a rate of housing rotation relative to the mounting base.

10. A system according to claim 9, wherein the external scanner is fixed with respect to the base.

11. An optical scanner system comprising:
a housing;
a detector contained within the housing configured to produce at least two resolvable azimuth fields-of-view relative to center-axis of the housing, the detector being a matrix of detectors positioned in a symmetrical M by M array; and
an external scanner rotatable relative to the center-axis of the housing switching between at least two elevations relative to a nominal optical axis of the detector, wherein motion of the housing azimuthally results in the detector producing a continuous coverage pattern at multiple elevations;
wherein a received light flux from two or more lenses is coupled to the detector, the optical axis of the two or more lenses radiating from the center of the detector, are contained in one or more planes parallel to a detection plane, and angularly separated by 90 degrees and coincident with the center of the symmetrical array;
wherein a folding mirror is situated to rotate lens optical paths by about 90 degrees; and
wherein M is an integer greater than 1.

12. An optical scanner system comprising:
a housing;
a rotary bearing;
a rotary motor;
a rotary position encoder;
a detector contained within the housing configured to produce at least two resolvable azimuth fields-of-view relative to a center-axis of the housing; and
an external scanner rotatable relative to the center-axis of the housing switching between at least two elevations relative to a nominal optical axis of the detector, the external scanner including a series of diffractive or refractive beam deviation prisms distributed uniformly around the perimeter of a cylindrical drum;
wherein motion of the housing azimuthally results in the detector producing a continuous coverage pattern at multiple elevations; and
wherein the detector is synchronized to produce at least one scan of the azimuth field-of-view during a period of substantial overlap of an elevation scan facet and a receiver.

13. An optical scanner system comprising:
a housing;
a detector contained within the housing configured to produce at least two resolvable azimuth fields-of-view relative to a center-axis of the housing; and
an external scanner rotatable relative to the center-axis of the housing switching between at least two elevations relative to a nominal optical axis of the detector, wherein motion of the housing azimuthally results in the detector producing a continuous coverage pattern at multiple elevations;
wherein the external scanner comprises a segmented elevation deflector fixed in an entrance aperture of a receiver;
wherein one or more sets of vertically oriented diffractive or refractive elevation deflectors are contained with the entrance aperture of a lens coupled to the detector; and
a cylindrical drum surrounding the detector, wherein the drum includes a repeating vertical pattern of alternating transmission and attenuation regions matched to the periodicity and orientation of a beam deflector pattern.

14. A system according to claim 13, further comprising:
a rotary bearing;
a motor coupled to the drum to provide a fixed rotational rate of the cylinder relative to the housing; and
a position detector situated to provide at least one on indication of a position of a cylinder mask pattern relative to the housing during a rotation of the cylinder.

15. A system according to claim 14, wherein the cylindrical drum is rotated at a rate based on a pitch of the cylinder mark pattern and the circumference of the cylindrical mask.

* * * * *